No. 835,997. PATENTED NOV. 13, 1906.
W. H. WILLIAMS.
PLOW.
APPLICATION FILED DEC. 12, 1905.

2 SHEETS—SHEET 1.

Witnesses
H. C. Rodgers
Fred V. Griffith

Inventor
Wm. H. Williams
By George H. Thorpe atty.

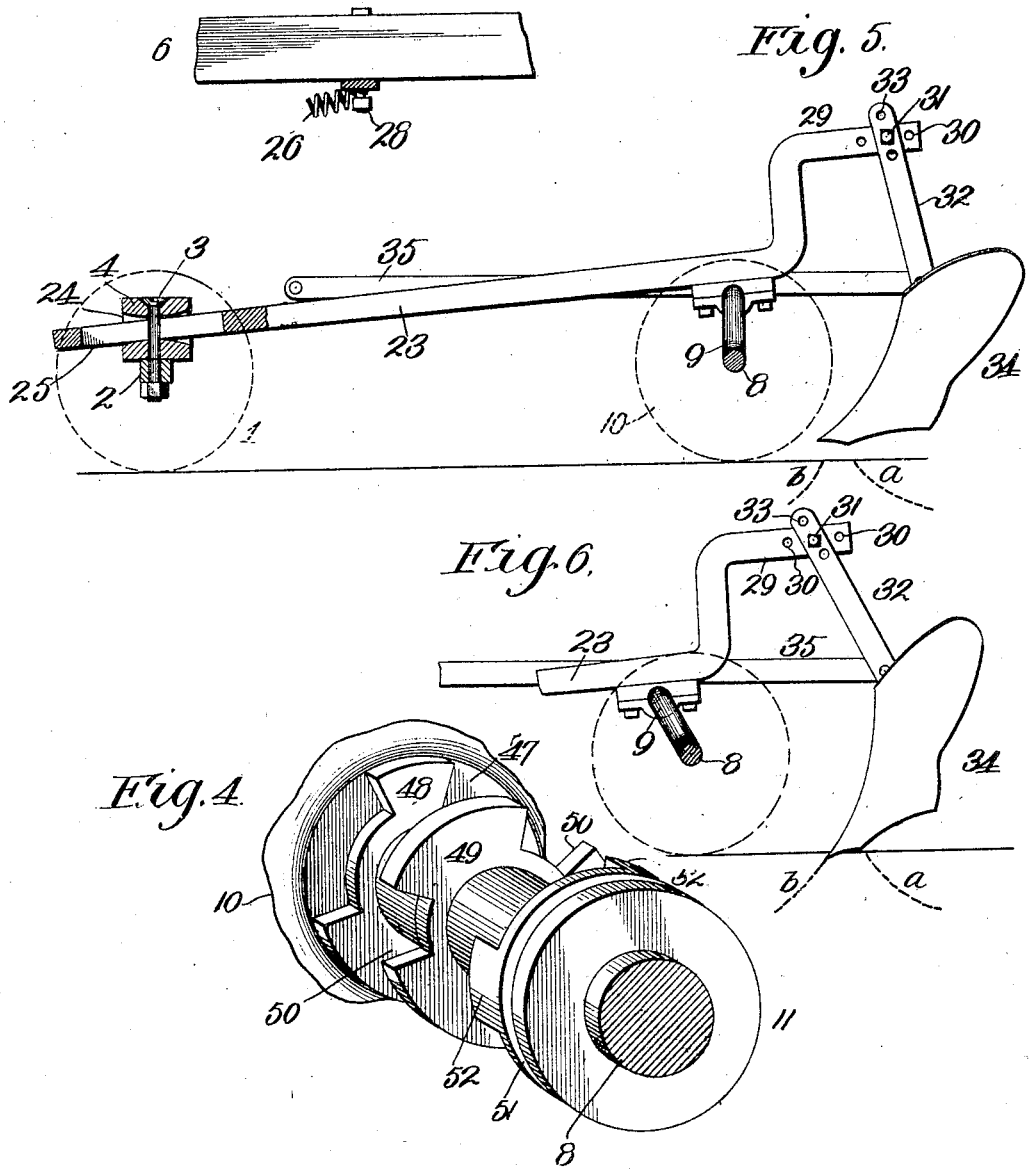

UNITED STATES PATENT OFFICE.

WILLIAM H. WILLIAMS, OF BELLE, OKLAHOMA TERRITORY.

PLOW.

No. 835,997.  Specification of Letters Patent.  Patented Nov. 13, 1906.

Application filed December 12, 1905. Serial No. 291,393.

*To all whom it may concern:*

Be it known that I, WILLIAM H. WILLIAMS, a citizen of the United States, residing at Belle, in the county of Custer and Territory of Oklahoma, have invented certain new and useful Improvements in Plows, of which the following is a specification.

This invention relates to plows, and more especially to a plow for producing a continuous furrow or a series of short longitudinally-alined furrows, and is designed particularly as an improvement on the machine described and illustrated in my Patent No. 811,606, issued on February 2, 1906, on combined lister plows and planters, filed February 8, 1905, Serial No. 244,799.

One of the objects of the present invention is to produce means for locking the plow depressed, so as to produce a continuous furrow, or elevated, so that it is carried inoperatively above the ground. A second object is to provide auxiliary means for assisting in the heaviest work of the plow and resisting its lightest work.

With these and other objects in view, as hereinafter appear, the invention consists in certain novel and peculiar features of construction and organization, as hereinafter described and claimed, and in order that it may be fully understood reference is to be had to the accompanying drawings, in which—

Figure 1:
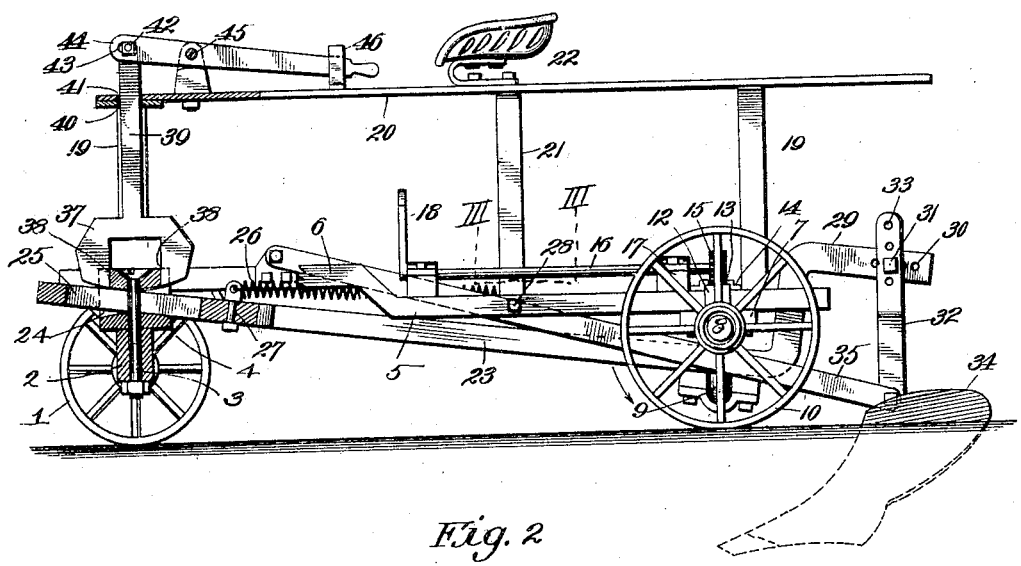
Figure 2:
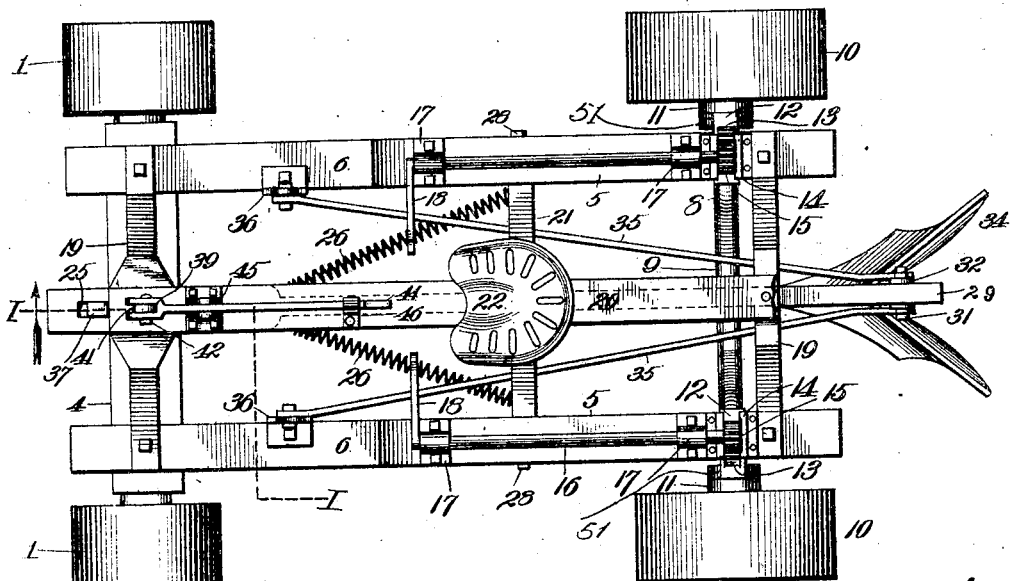

Figure 1 is a side elevation, partly in section on the line II of Fig. 2, of a plow embodying my invention. Fig. 2 is a top plan view of the machine with the rear end of the arched frame broken away. Fig. 3 is a detail horizontal section taken on the line III III of Fig. 1. Fig. 4 is a sectional perspective view to show the construction whereby the rear wheels are locked upon the rear shaft or crank axle. Fig. 5 is a view, partly in elevation and partly in central longitudinal section, showing the plow at its highest point. Fig. 6 is a similar view of the rear portion of the mechanism shown in Fig. 5 after the machine has moved forward a slight distance from the position shown in Fig. 5 to show the plow in the position it occupies as it starts to enter the ground.

In the said drawings, 1 indicates the front wheels journaled on opposite ends of axle 2. 3 is a king-bolt extending through said axle.

A frame is constructed as follows: 4 is a cross-bar resting on the axle and secured at its opposite ends to the front ends of a pair of side bars 5, the latter being arched at their front ends, as at 6, in order that the front wheels may turn thereunder to permit the machine to be turned in a small space. The drawings do not show said wheels sufficiently small for the purpose mentioned, but that is the chief reason for arching the side bars.

7 indicates bearings depending from the rear ends of the side bars, and 8 a crank-shaft journaled therein, the crank 9 of the shaft being disposed centrally of its length.

10 indicates the rear wheels of the machine, the same being journaled on the ends of the crank-shaft, a clutch mechanism for locking the wheels rigid with the shaft when desired being constructed as follows: 47 indicates notches in the hub of each wheel 10, and 48 shoulders between said notches. Inward of each hub and rigid on the shaft is a collar 49, provided with peripheral notches 50, adapted to register with but shorter than notches 47, and in this connection attention is called to Fig. 4, which shows the notched collar withdrawn from the hub simply for the purpose of making the construction clear. In practice the collars 49 will be almost in frictional contact with the hubs. The slidable member 11 of each clutch is provided with a groove 51 and a plurality of outwardly-projecting peripheral tongues 52, corresponding in number to notches 50, and adapted at times to project through said notches into notches 47 to lock the wheels and rigid collars 49 together, and thus compel shaft 8 to be turned by said wheels as the machine is drawn across the field. In view of the fact that the tongues 52 are narrower than the length of notches 47 it is obvious that the wheels have a limited independent movement on the shaft, which lost motion is provided in order to accommodate lateral vibration of the tongue, which causes first one front wheel and then the other to move in advance of its companion, and which would result if the wheels had no lost motion in applying a twisting strain on the front axle.

12 indicates forked arms of the customary type, with their forks engaging the grooves 51, said arms overlying the side bars 5 and having teeth 13 so as to constitute rack-bars, which rack-bars are adapted to slide inward and outward and are guided in such movements by the guides 14 secured to the side bars.

15 indicates cog-wheels engaging the rack-bars and secured on the rear ends of shafts 16, journaled in bearings 17, secured to the side bars and provided at their front ends with crank-arms 18, adapted for operation by preference by the operator's feet. The weight of the arms 18 is such that when in the position shown in Fig. 2 they hold the clutch members locked, so that the rotation of the wheels 10 will impart like movement to the crank-shaft. When the crank-arms 18 project outward and upwardly, they hold the clutch members disengaged, so that wheels 10 are free to turn on the crank-shaft.

A superstructure or arch-frame comprises the arches 19, secured at their lower ends to the side bars, and the longitudinal bar 20, connecting said arches. The frame may also be provided with one or more supplemental arches 21, if desired, and mounted upon bar 20, contiguous to arch 21, by preference, is the seat 22 for the driver.

23 indicates the plow-beam, the same having its front end extending slidingly through a slot or opening 24 in the cross-bar 4 and also having a longitudinal slot 25, through which the king-bolt extends. 26 indicates a pair of retractile springs secured at their front ends to the beam, as shown at 27, (see Fig. 1,) and at their rear ends to the bolts 28, used for securing arch 21 to the side bars, it being obvious, of course, that the rear ends of the springs 26 may be otherwise secured to fixed points on the frame. The tendency of these springs is to hold the beam withdrawn to the rear as far as possible, for a reason which hereinafter appears. The rear end of the beam 23 preferably terminates in an angular portion 29, the substantially horizontal arm of said portion being disposed in a higher plane than the rear end of the main portion of the beam, and said portion 29 is equipped with a longitudinal series of holes 30 to receive the bolt 31, also extending through one of a vertical series of apertures 33 in a bar 32, projecting upward from the lister or double moldboard plow 34, though obviously the plow may be of any form suitable for the work to be done.

To brace the plow and cause it to tilt its point upwardly or downwardly to facilitate its progress toward or away from the surface of the ground, a pair of links 35, pivotally connect bar 32 with the brackets 36, secured to the side bars 5, the forward portion of said links being disposed above springs 26 in order to avoid conflict therewith.

For the purpose of locking the plow-beam against longitudinal movement, I provide a wedge in the form of a vertical fork 37, engaging notches 38 in the front and rear sides of the cross-bar 4, said wedge having a stem 39, extending up through registering openings 40 and 41 in the widened portion of the front arch 19 and the front portion of bar 20. The upper end of the forked stem is provided with a bolt 42, engaging a longitudinal slot 43 in a lever 44, fulcrumed in brackets 45, carried by bar 20. The lever 44 is preferably of resilient metal, so that it may spring under the overhanging upper portion of the angle-bracket 46, carried by bar 20. When the lever is thus secured, as shown, the wedge is disposed above the plane of the plow-beam, so as not to interfere with the reciprocatory operation thereof.

As the machine is drawn across the field the crank-shaft revolves in the direction indicated by the arrow, Fig. 1, and causes the front end of the plow-beam to reciprocate on the king-bolt, the plow entering the ground when the crank of the shaft has just passed over and forward of its axis of movement, as shown in Fig. 6, and emerging from the ground just before said crank assumes the vertical position above its axis shown in Fig. 5. It will thus be seen that the plow is in the ground for almost a complete revolution of the crank-shaft, but that the length of time it is in the ground may be varied by adjusting bar 32 vertically on the plow-beam. The plow in this operation produces a series of concave furrows or ditches in longitudinal alinement with each other, the dotted line $a$ indicating the front or last-formed end of the furrow produced by the upward movement of the plow and the dotted line $b$ the rear or first-formed end of the next furrow in advance, said last-named furrow being produced in the movement of the machine forward from the position indicated in Fig. 6. In the production of each furrow it is necessary for the plow to point downward in making the first half of the furrow (see Fig. 6) and upward in making the last half, the link-braces 35 accomplishing this object because of the independent forward and backward movement imparted to the plow-beam by the crank-shaft.

When it is desired to lock the beam against longitudinal movement, with the plow in or out of the ground, the operator disengages the lever from bracket 46 and raises the handle end of the same, so as to force the wedge downward into the slot 25 of the plow-beam, and thus lock the latter against longitudinal movement. When thus locked with the plow in the ground, a continuous furrow will be produced, it being of course understood that immediately after the plow-beam slot is engaged by the wedge the crank-arms 18 must be operated to disengage the clutches and leave the rear wheels free to turn on the crank-shaft. If it be desired to plow at a different depth, the bar 32 will be adjusted vertically on the portion 29 of the beam, it being apparent that said bar should likewise be adjusted longitudinally of portion 29 in order that said bar 32 shall be upright when the crank is disposed vertically below or above its axis of movement.

When the wedge or locking device is withdrawn from the slot 25 of the beam, the springs 26 resist the rear wheels as they drive the plow into the ground until the plow has penetrated about half its distance—i. e., until the crank 9 has moved down to a horizontal position. As the crank passes such plane the springs begin to coöperate with the wheels in driving the plow deeper and continue such assistance until the crank has attained a horizontal position rearward of its axis of rotation, after which the springs again resist the wheels as they effect the emergence of the plow from the ground. In this connection it will be understood that the rearward movement of the plow is only relative, because the machine is being drawn forward at such a speed that the plow actually moves forward at all times, as explained clearly in the patent to which reference has been made heretofore.

As the plow emerges from the ground, as above explained, its tendency is to jump forward and upward because of the play or lost motion in the clutch mechanism of the rear wheels, as explained in the aforesaid application; but at such moment the beam is fully withdrawn and the springs 26 are prepared to and do offer a yielding resistance to such movement, and therefore prevent the jar or jolt which would be the result of such movement and which would be injurious to the clutch mechanism. In this connection it will be seen that because the plow is tilted downward while moving in that direction and upward while moving upward it actually plows its way in both directions, and therefore operates more efficiently than if the driving-wheels were wholly depended upon to force it into and pull it out of the ground.

The normal position of the plow when elevated is with its point barely out of contact with the ground. (See Fig. 5.) In traveling over rough ground the plow in the position just described would be apt to dig into the ground at intervals or strike obstructions, and thus in one case impose an additional burden on the team or result in injury to the plow. To avoid this, when traveling over rough ground the plow may be raised to a higher plane by vertical adjustment of bar 32 on portion 29 of the beam, as will be readily understood.

From the above description it will be apparent that I have produced a plow possessing the features of advantage enumerated as desirable in the statement of invention and which obviously may be modified in minor details without departing from the principle of construction involved.

Having thus described the invention, what I claim as new, and desire to secure by Letters Patent, is—

1. In a machine of the character described, a carrying-frame, a crank-shaft journaled thereon, means to revolve said shaft, a plow journaled on the shaft, means to tilt the plow to cause it to plow downward and upward alternately, and means for yieldingly resisting movement of the plow in a forward direction independent of the machine travel.

2. In a machine of the character described, a carrying-frame, a crank-shaft journaled thereon, means to revolve said shaft, a plow journaled on the shaft, means to tilt the plow to cause it to plow downward and upward alternately, means for yieldingly resisting movement of the plow in a forward direction independent of the machine travel, and means to lock the plow against movement independent of the machine travel.

3. In a machine of the character described, a carrying-frame, a crank-shaft journaled thereon, means to revolve said shaft, a plow journaled on the shaft, means to tilt the plow to cause it to plow downward and upward alternately, and one or more retractile springs secured at their front ends to the plow-beam and at their rear ends to the carrying-frame.

4. In a machine of the character described, a carrying-frame, a crank-shaft journaled thereon, means to revolve said shaft, a plow journaled on the shaft, means to tilt the plow to cause it to plow downward and upward alternately, one or more retractile springs secured at their front ends to the plow-beam and at their rear ends to the carrying-frame, and means to lock the plow against movement independent of the machine travel.

5. In a machine of the character described, a carrying-frame, having a guide-opening at its front end, a crank-shaft journaled in the rear portion of said frame, means to revolve said shaft, a plow having its beam journaled on the crank-shaft and projecting through said guide-opening, means to tilt said plow to cause it to plow downward and upward alternately, and means for yieldingly resisting movement of the plow in a forward direction independent of the machine travel.

6. In a machine of the character described, a carrying-frame, having a guide-opening at its front end, a crank-shaft journaled in the rear portion of said frame, means to revolve said shaft, a plow having its beam journaled on the crank-shaft and projecting through said guide-opening, means to tilt said plow to cause it to plow downward and upward alternately, means for yieldingly resisting movement of the plow in a forward direction independent of the machine travel, and means to lock the plow against movement independent of the machine travel.

7. In a machine of the character described, a carrying-frame, having a guide-opening at its front end, a crank-shaft journaled in the rear portion of said frame, means to revolve said shaft, a plow having its beam journaled on the crank-shaft and projecting through said guide-opening and provided with a longitudinal slot, a wedge for engagement with said slot to lock the beam against reciprocatory movement, and means to render the plow rigid with respect to the beam.

8. In a machine of the character described, a carrying-frame, having a guide-opening at its front end, a crank-shaft journaled in the rear portion of said frame, means to revolve said shaft, a plow having its beam journaled on the crank-shaft and projecting through said guide-opening and provided with a longitudinal slot, a wedge for engagement with said slot to lock the beam against reciprocatory movement, and means whereby the plow may be vertically adjusted with respect to the beam.

9. In a machine of the character described, a carrying-frame, having a guide-opening at its front end, a crank-shaft journaled in the rear portion of said frame, means to revolve said shaft, a plow having its beam journaled on the crank-shaft and projecting through said guide-opening and provided with a longitudinal slot, a wedge for engagement with said slot to lock the beam against reciprocatory movement, means whereby the plow may be vertically adjusted with respect to the beam and braces between the plow and the carrying-frame to secure the latter rigid with the beam.

10. In a machine of the character described, front and rear wheels, an axle connecting the front wheels, a crank-shaft connecting the rear wheels, a frame journaled on the crank-shaft and pivoted on the axle, a plow-beam journaled on the crank of the shaft and having its front end guided to reciprocate in the front part of said frame and provided with a longitudinal slot, a plow provided with a bar pivoted to the rear end of the plow-beam, links pivotally connecting said bar with said frame, and a reciprocatory wedge carried by said frame and adapted to engage the slot of the plow-beam to lock the latter from reciprocatory movement.

11. In a machine of the character described, front and rear wheels, an axle connecting the front wheels, a crank-shaft connecting the rear wheels, a frame journaled on the crank-shaft and pivoted on the axle, a plow-beam journaled on the crank of the shaft and having its front end guided to reciprocate in the front part of said frame and provided with a longitudinal slot, a plow provided with a bar pivoted to the rear end of the plow-beam, links pivotally connecting said bar with said frame, a reciprocatory wedge carried by said frame and adapted to engage the slot of the plow-beam to lock the latter from reciprocatory movement, and means to lock said wedge in or out of engagement with said slot.

12. In a machine of the character described, front and rear wheels, an axle connecting the front wheels, a crank-shaft connecting the rear wheels, a frame journaled on the crank-shaft and pivoted on the axle, a plow-beam journaled on the crank of the shaft and having its front end guided to reciprocate in the front part of said frame and provided with a longitudinal slot, a plow provided with a bar pivoted to the rear end of the plow-beam, links pivotally connecting said bar with said frame, and a vertical forked wedge guided in the front part of said frame and adapted to engage the slot of said beam forward and rearward of the axis of movement of said frame with the axle.

13. In a machine of the character described, front and rear wheels, an axle connecting the front wheels, a crank-shaft connecting the rear wheels, a frame journaled on the crank-shaft and resting on the axle, a king-bolt extending through said frame and axle, a plow-beam journaled on the crank of the shaft and having its front end guided to reciprocate in the front part of said frame and provided with a longitudinal slot, engaged by the king-bolt, a plow provided with a bar pivoted to the rear end of the plow-beam, links pivotally connecting said bar with said frame, and a reciprocatory wedge carried by said frame and adapted to engage the slot of the plow-beam to lock the latter from reciprocatory movement.

14. In a machine of the character described, front and rear wheels, an axle connecting the front wheels, a crank-shaft connecting the rear wheels, a frame journaled on the crank-shaft and pivoted on the axle, a plow-beam journaled on the crank of the shaft and having its front end guided to reciprocate in the front part of said frame and provided with a longitudinal slot, a plow provided with a bar pivoted to the rear end of the plow-beam, links pivotally connecting said bar with said frame, a reciprocatory wedge carried by said frame and adapted to engage the slot of the plow-beam to lock the latter from reciprocatory movement, and antifriction devices between the front portion of said frame and the plow-beam.

15. In a machine of the character described, front and rear wheels, an axle connecting the front wheels, a crank-shaft connecting the rear wheels, a frame journaled on the crank-shaft and pivoted on the axle, a plow-beam journaled on the crank of the shaft and having its front end guided to reciprocate in the front part of said frame and provided with a longitudinal slot, a plow provided with a bar pivoted to the rear end of the plow-beam, links pivotally connecting said bar with said frame, a superstructure on said frame and provided with a seat, a vertically-movable wedge carried by and guided on said frame and superstructure in the vertical plane of the slot of the beam, and means for causing said wedge to engage the slot of said beam or withdraw it therefrom.

16. In a machine of the character described, front and rear wheels, an axle connecting the front wheels, a crank-shaft connecting the rear wheels, a frame journaled on the crank-shaft and pivoted on the axle, a plow-beam journaled on the crank of the shaft and having its front end guided to reciprocate in the front part of said frame and provided with a longitudinal slot, a plow provided with a bar pivoted to the rear end of the plow-beam, links pivotally connecting said bar with said frame, a superstructure on said frame and provided with a seat, a vertically-movable wedge carried by and guided on said frame and superstructure in the vertical plane of the slot of the beam, means for causing said wedge to engage the slot of said beam or withdraw it therefrom, and means to secure said wedge in its elevated position.

In testimony whereof I affix my signature in the presence of two witnesses.

WILLIAM H. WILLIAMS.

Witnesses:
H. C. RODGERS,
G. Y. THORPE.